United States Patent
Iwasaki (10) Patent No.: US 9,465,738 B2
(45) Date of Patent: Oct. 11, 2016

(54) INFORMATION PROCESSING SYSTEM, CONTROL METHOD, PROGRAM, AND RECORDING MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 101 days.

(21) Appl. No.: 14/355,433

(22) PCT Filed: Oct. 31, 2012

(86) PCT No.: PCT/JP2012/078770
§ 371 (c)(1),
(2) Date: Apr. 30, 2014

(87) PCT Pub. No.: WO2013/069655
PCT Pub. Date: May 16, 2013

(65) Prior Publication Data
US 2014/0304481 A1 Oct. 9, 2014

Related U.S. Application Data

(60) Provisional application No. 61/556,438, filed on Nov. 7, 2011.

(51) Int. Cl.
*G06F 12/08* (2016.01)
*G06F 9/54* (2006.01)

(52) U.S. Cl.
CPC ............. *G06F 12/0813* (2013.01); *G06F 9/54* (2013.01)

(58) Field of Classification Search
CPC ..... G06F 12/0813; G06F 12/084; G06F 9/54
See application file for complete search history.

(56) References Cited

U.S. PATENT DOCUMENTS 8,966,188 B1 *  2/2015  Bardale ................ G06F 12/109
                                                       711/104
2004/0267824 A1  12/2004  Pizzo et al.
(Continued)

FOREIGN PATENT DOCUMENTS

JP       07-114476       5/1995
JP       2004-289603     10/2004
(Continued)

OTHER PUBLICATIONS

Toshihiro Yasuda et al., "A Study on Server Rendering for Interactive 3D Virtual Environments on a Web Brouser, Correspondences on Human Interface"Nov. 6, 2008, pp. 17-20.
(Continued)

*Primary Examiner* — Edward Dudek, Jr.
(74) *Attorney, Agent, or Firm* — Greenblum & Bernstein, P.L.C.

(57) ABSTRACT

An information processing system that determines whether static data is already loaded into shared memory when a request is made to load static data into shared memory from a process out of a plurality of processes. When the information processing system determines that static data is not loaded into shared memory, after loading the data into shared memory, it notifies the requesting process with information identifying the static data. When the information processing system determines that the static data is already loaded into shared memory, it notifies the requesting process with information identifying the static data.

10 Claims, 4 Drawing Sheets

(56) References Cited

U.S. PATENT DOCUMENTS

2006/0101446 A1* 5/2006 Mariani .............. G06F 9/44563
717/166
2010/0235377 A1 9/2010 Kuryata et al.
2010/0306813 A1* 12/2010 Perry ...................... A63F 13/10
725/114

FOREIGN PATENT DOCUMENTS

| | | |
|---|---|---|
| JP | 2009-045091 | 3/2009 |
| JP | 2010-055493 | 3/2010 |
| WO | WO2009/138878 | 11/2009 |

OTHER PUBLICATIONS

European Patent Office (EPO) Office action, mail date is Feb. 3, 2015.
Brent E. Rector et al., "Win32 Programming Encyclopedia (the last volume)", the first edition Win32 Programming, ASCII Corporation, Mar. 21 1998, the first edition, pp. 295-299.
Japan Office action, dated Feb. 2, 2015 along with an English translation thereof.

* cited by examiner

| FILE NAME OF RENDERING OBJECT | MEMORY HANDLE |
|---|---|
| FILE A | MEMORY HANDLE A |
| FILE B | MEMORY HANDLE B |
| ⋮ | ⋮ |
| FILE N | MEMORY HANDLE N |

INFORMATION PROCESSING SYSTEM, CONTROL METHOD, PROGRAM, AND RECORDING MEDIUM

CLAIM FOR PRIORITY

This application is a U.S. National Stage of PCT/JP2012/078770 Oct. 31, 2012, and claims the priority benefit of U.S. provisional application 61/556,438, filed Nov. 7, 2011, the contents of which is expressly incorporated by reference herein in its entirety.

TECHNICAL FIELD

The present invention relates to an information processing system, a control method, a program, a recording medium, and particularly to a technique of loading static data into shared memory.

BACKGROUND ART

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multiplayer Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device performs rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to perform rendering processing require a user to use a PC having sufficient rendering performance or a dedicated game device. For this reason, the number of users of a network game (one game) depends on the performance of the client device required by the game. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in International Publication No. 2009/138878, a server acquires the information of an operation caused in a client device and provides, to the client device, a game screen obtained by performing rendering processing using the information.

Regarding games consoles for home use, among conventional games, there are cases in which static data is used in the game process of the game. In these cases, by reading the static data out of a storage medium and loading the static data into the memory of the game console, the static data becomes usable. For example, in rendering processing, there are cases in which the same model data is arranged multiple times within the screen, and cases in which the same model data is used repetitively over consecutive frames. For this reason, the static data, that is loaded into the memory, is temporarily retained and reused.

On the other hand, in games like International Publication No. 2009/138878, in order to provide game screens to each connected client device, the server processes the game for each client device independently even when the game is identical. In this case, because there are a large number of client devices connected to the server, memory is not provided to be used for the loading of static data for each individual client device. In other words, memory is shared between the game processes of multiple client devices.

However, when multiple game processes share memory for identical games in this way, the same static data gets loaded into memory multiple times. In other words, for games like International Publication No. 2009/138878, a game process for one client device had no way of knowing whether static data that it is to use had already been loaded into memory by the game process for another client device. In other words, multiple game processes that is performed processing independently have not to date been sharing static data that is loaded into memory.

SUMMARY OF INVENTION

The present invention has been made in consideration of the above-described problems of the prior art. The present invention provides an information processing system for sharing static data that is loaded into memory in the context of a plurality of processing instances that are executed independently, a control method, a program, and a recording medium.

The present invention in its first aspect provides an information processing system that independently performs a plurality of processes that use static data, the system comprising: receiving means for receiving a load request from a process out of the plurality of processes to load a static data element into a shared memory; loading means for loading the static data element, for which the load request is made, into the shared memory; notifying means for notifying a process that carried out the load request with information that identifies the static data element which is loaded into the shared memory; controlling means for controlling the loading means and the notifying means, wherein in the case where the controlling means determines that the static data element, for which the load request is made, is not loaded into the shared memory, after making the loading means to load the static data element into the shared memory, the controlling means makes the notifying means to notify the process, that made the load request, with information that identifies the static data element which is loaded into the shared memory by the loading means, and in the case where the controlling means determines that the static data element, for which the load request is made, is already loaded into the shared memory, the controlling means makes the notifying means to notify the process, that made the load request, with information that identifies the static data element which is already loaded into the shared memory.

Further features of the present invention will become apparent from the following description of exemplary embodiments (with reference to the attached drawings).

DESCRIPTION OF EMBODIMENTS

An exemplary embodiment of the present invention will now be described in detail with reference to the accompanying drawings. Note that in the following embodiment, an example of an information processing system will be explained in which the present invention is applied to a game server 100 that carries out a game providing service for one game. However, it is possible to apply the current invention to any device that can independently perform a plurality of processes that use static data.

(Game Providing System Configuration)

Figure 1:
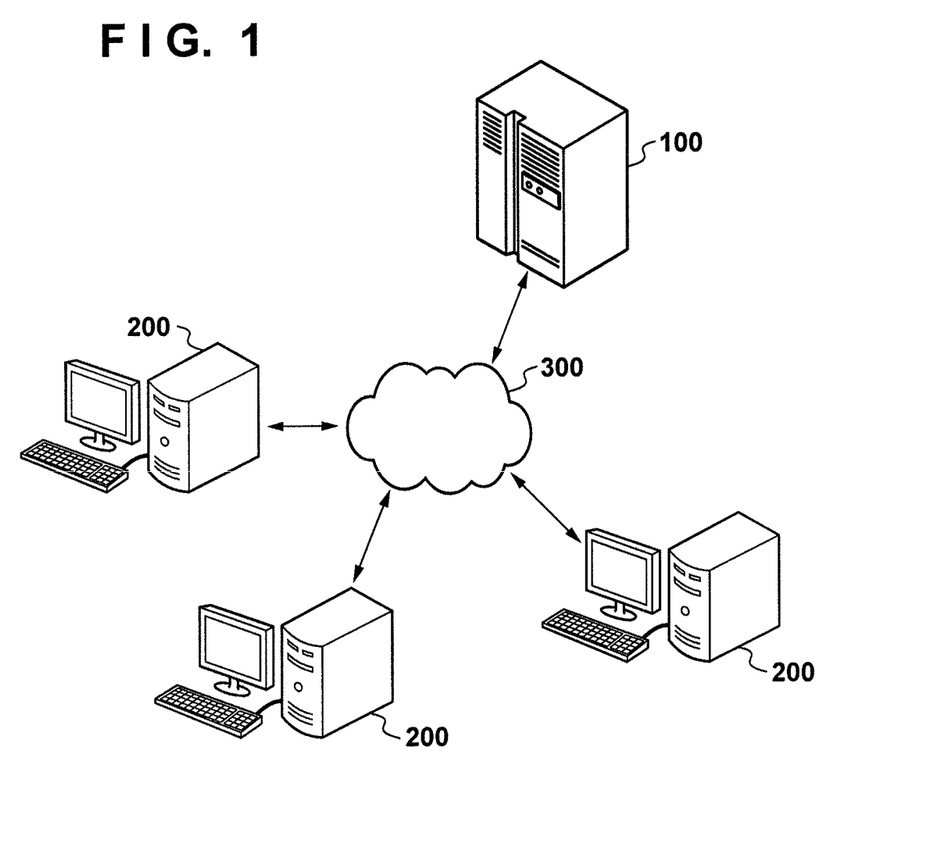
FIG. 1 is a diagram illustrating a configuration of a game providing system according to the embodiment of the invention.

FIG. 1 is a diagram illustrating a system configuration of a game providing system according to the embodiment of the invention.

As illustrated in the diagram, the game server 100 is connected to a plurality of client devices 200 via a network 300. In this embodiment, the game server 100 performs independently game processing for providing game screens of a game to each respective connected client device 200. Specifically, on the game server 100 the same number of game processing instances as the number of connected client devices 200 are performed.

In the game processing for the respective client devices 200, operation input is made on a client device is received, and game screens depending on the operation are rendered frame by frame. The game server 100 may for example encode game screens that is rendered, and send the game screens as encoded video data to the respective client devices 200. At this time, when the client devices 200 receive the encoded video data from the game server 100, the client devices decode and play back the data, and thereby it is possible to provide to the user the game screen changed according to the operation input.

Note, in the game providing system of this embodiment, the client device 200, that receives the provided game screen, may be a device, such as, for example, a PC, a home game console, a portable game console, a mobile phone, a PDA or a tablet, that can input operations and can display a game screen sent by the game server 100.

(Game Server 100 Configuration)

Figure 2:
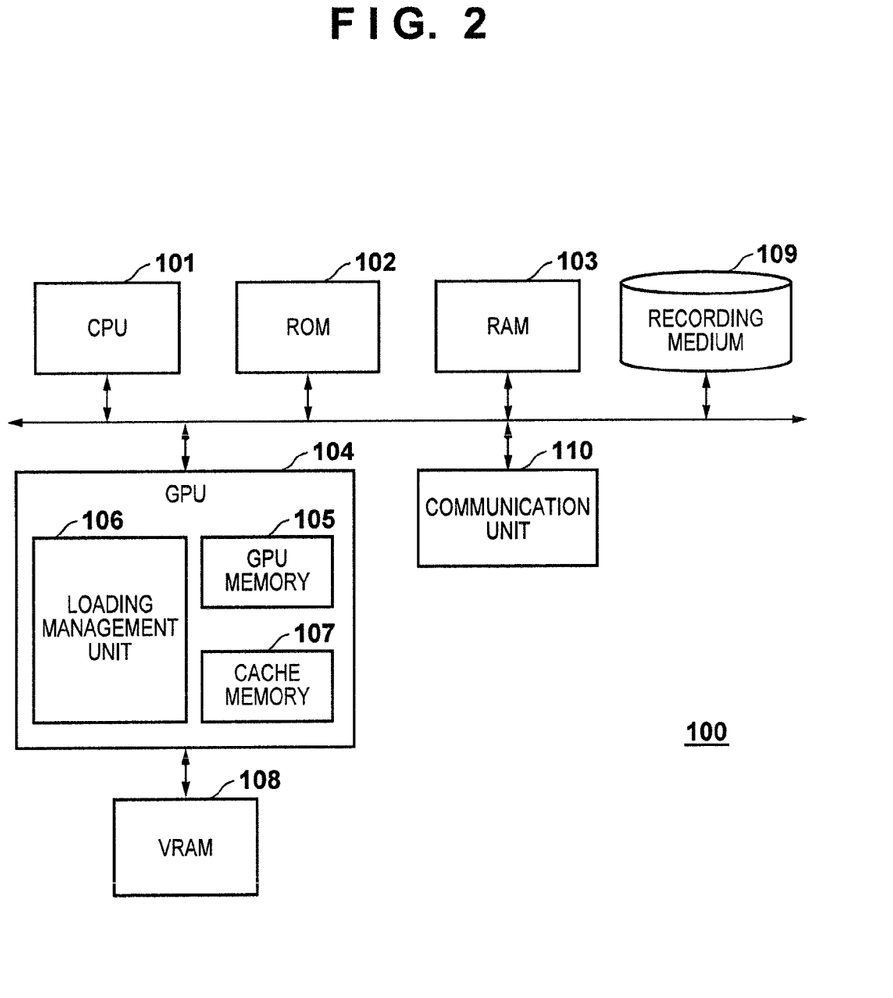
FIG. 2 is a block diagram illustrating a functional configuration of a game server 100 according to the embodiment of the invention.

FIG. 2 is a block diagram illustrating a functional configuration of a game server 100 according to the embodiment of the invention.

A CPU 101 controls the operation of each block in the game server 100. Specifically, the CPU 101 reads an operation program for game processing and the like that is stored on, for example, a ROM 102, loads the program into a RAM 103 and executes the program, thereby controlling the operation of each block.

The ROM 102 is, for example, a rewritable, non-volatile memory. The ROM 102, in addition to operation programs such as those for game processing, stores information such as constants that are necessary in the operation of each block in the game server 100.

The RAM 103 is a volatile memory. The RAM 103 is not just an area for the loading of operation programs, it is also used as a storage area for temporarily storing such things as intermediate data that is output in the operation of the blocks in the game server 100.

A GPU 104 carries out the generation of game screens that are displayed in the connected client devices 200. A VRAM 108 is connected to the GPU 104. When the GPU 104 receives a rendering command or camera position or direction information (viewpoint information) used for rendering a game screen from the CPU 101, the GPU 104 reads the data (static data) for the rendering object corresponding to the rendering instruction command from, for example, a later described recording medium 109, and loads the data into a GPU memory 105. When the GPU 104 renders with the connected VRAM 108, the GPU replicates the rendering object loaded in the GPU memory 105 to a cache memory 107. After that, the GPU memory 105 applies processing for generating a screen with respect to the rendering object that is replicated, and writes into the VRAM 108.

Note, in this embodiment, storage of a rendering object from the recording medium 109 to the GPU memory 105 is managed by an loading management unit 106. When the loading management unit 106 receives a request to load a rendering object from the GPU 104, the loading management unit 106 reads the data of the target rendering object from the recording medium 109, and loads the data into the GPU memory 105. Next, the loading management unit 106 returns to the GPU 104 the memory handle for the target rendering object that the loading management unit 106 loaded into the GPU memory 105. In this way, the GPU 104 can identify a target rendering object that is loaded into the GPU memory 105, and can use the object for rendering processing.

The recording medium 109, is a recording device, such as an HDD, that is removably connected to the game server 100. In this embodiment, things that are used for the rendering processing of a screen such as data for each rendering object, and information for light sources that are arranged in a three dimensional scene that is expressed in a screen are stored in the recording medium 109.

A communication unit 110 is a communication interface of the game server 100. In this embodiment, the communication unit 110 sends data to and receives data from other devices such as client devices 200 that are connected via the network 300. Note, the communication unit 110 converts data formats in accordance with the communication specifications. In this embodiment, data that is sent between the game server 100 and a client device 200 is encoded video data that is encoded by an encoder (not shown) from a game screen generated by the GPU 104, or input data for an operation carried out on a client device 200.

(Loading Management Processing)

Figure 3:
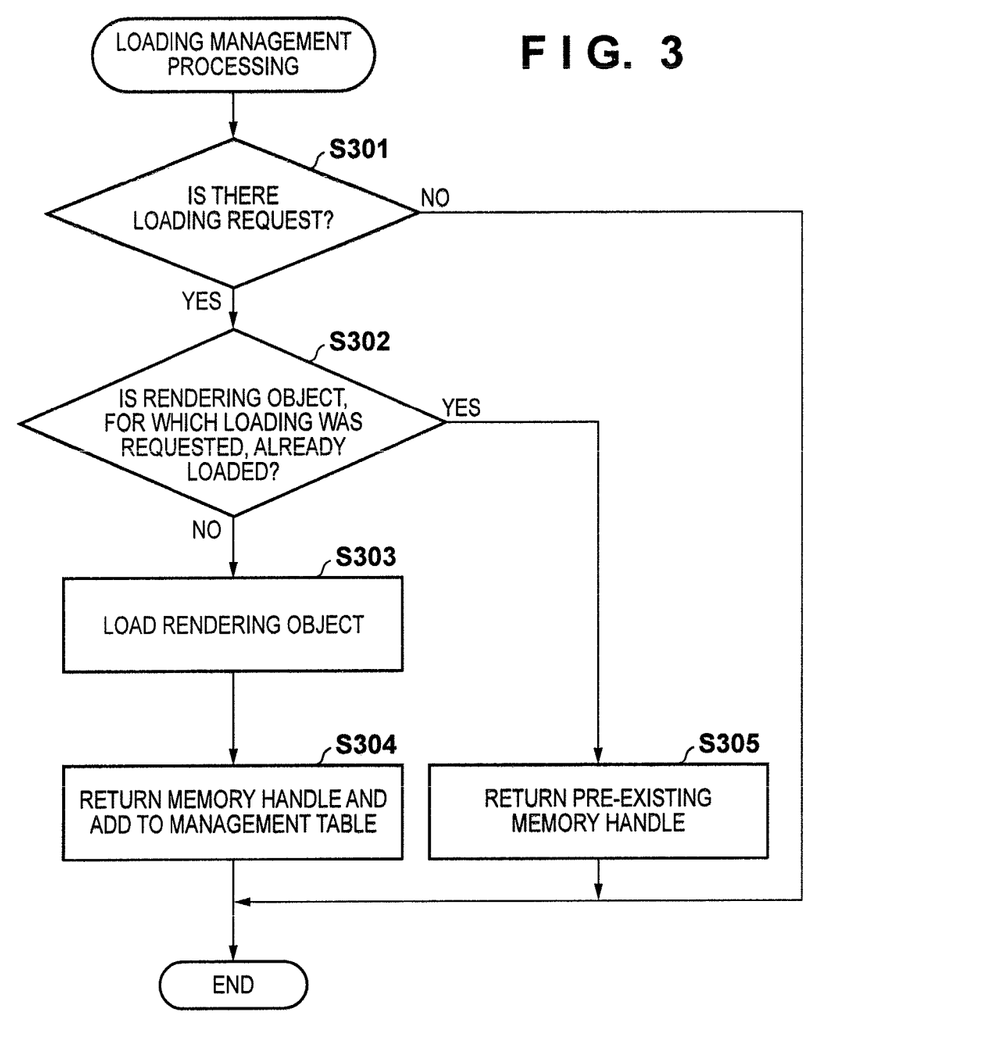
FIG. 3 is a flow chart that exemplifies loading management processing executed in the game server 100 according to the embodiment of the invention.

Regarding the loading management processing performed in the game providing system game server 100 of this embodiment, having this kind of configuration, the processing is explained in detail using the flowchart of FIG. 3. The processing corresponding to this flowchart can be realized by the CPU 101 reading out a corresponding processing program to recorded, for example, on ROM 102, loading the program into RAM 103, and executing the program. Note, in this embodiment, this loading management processing is started when the game server 100 is started up and is repeatedly executed.

In step S301, the loading management unit 106 determines whether the loading of a rendering object is requested by the GPU 104. Specifically, in the case where the loading management unit 106 determined that the loading of a rendering object is requested, the CPU 101 moves the processing on to step S302. Also, when the loading management unit 106 determines that the loading of a rendering object is not requested, the CPU 101 completes the current loading management processing.

Figure 4:
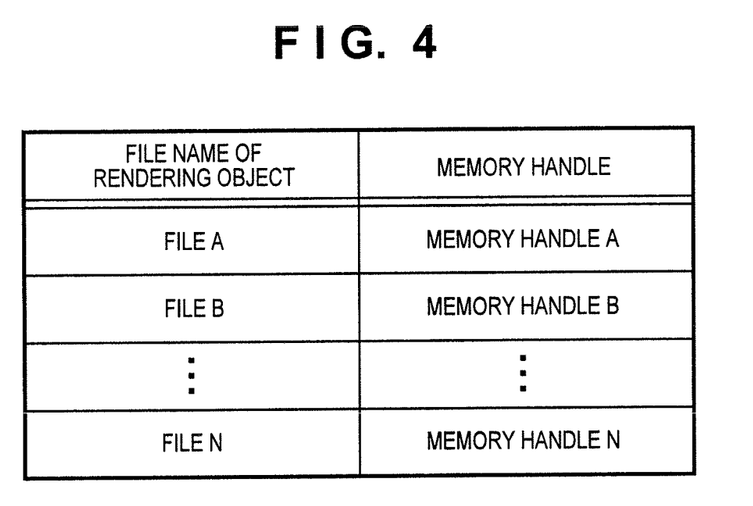
FIG. 4 is a diagram that exemplifies a management table that is used for loading management processing according to the embodiment of the invention.

In step S302, the loading management unit 106 determines whether the rendering object for which loading is requested is already loaded into the GPU memory 105. The loading management unit 106 manages rendering objects that are already loaded into the GPU memory 105 with a management table that is stored, for example in RAM 103. The management table, for example, manages the file name of static data for rendering objects that are already loaded, as shown in FIG. 4. In other words, in this step, the loading management unit 106 determines whether a file name corresponding to the data of the rendering data for which loading is requested exists in the management table. In the case where a rendering object, for which loading is requested, is determined by the loading management unit 106 to be already loaded into the GPU memory 105, the CPU 101 moves the processing on to step S305. Furthermore, in the case where a rendering object, for which loading is requested, is determined by the loading management unit 106 not to be already loaded into the GPU memory 105, the CPU 101 moves the processing on to step S303.

In step S303, the loading management unit 106 reads the rendering object, for which loading is requested, out of the recording medium 109 and loads the object into GPU memory 105.

In step S304, the loading management unit 106 returns, to the GPU 104, the memory handle indicating the loading location for the rendering object that is loaded into the GPU memory 105. Furthermore, the loading management unit 106 associates the memory handle that indicates the loading location with a file name of the data of the rendering object for which loading is requested, inserts the association into the management table, and completes this loading management processing. Note, in this embodiment, it is explained that the rendering object is associated with a file name, and that a memory handle that indicates the loading location of the rendering object is managed in the management table, but the implementation of this invention is not limited to this. In the management table, the information for indicating the rendering object, which is already loaded, is not limited to the file name of the rendering object. The information can be information that can uniquely identify the rendering object such as, for example, an identification ID of the rendering object. Also, the information that indicates the loading location is not limited to the memory handle. The information can be any information that enables the identification of the loading location, such as for example a pointer. Furthermore, this information need not be managed in a management table. It is sufficient for information that can be referenced by the loading management unit 106 to be maintained.

On the other hand, in step S302, in the case where it is determined that the rendering object, for which loading is requested, is already loaded into the GPU memory 105, the loading management unit 106, in step S305, returns the memory handle, that indicates the loading location of the rendering object, to the GPU 104, and this loading management processing completes.

In this way, the game server 100 of this embodiment can avoid loading the same rendering object into the GPU memory 105 multiple times, even in the case where the game processing of generating a game screen for each of the plurality of connected client devices is performed in parallel. As a result, it is possible to reduce the amount of memory that is needed to be provided for the GPU memory 105, and the circuit size of the GPU can be reduced. Furthermore, because the frequency at which the data of rendering objects are read from the recording medium 109 can also be reduced, the time required for processing can be shortened, and the shortening of the operating life of the recording medium 109, which depends on access frequency, can be avoided.

Note, in the game server 100 of this embodiment, the example of the loading of data into the GPU memory 105 from the recording medium 109 is explained as the loading management processing, but the implementation of this invention is not limited to this. For the loading of data that is not duplicated into shared memory, for example the time at which data is duplicated from the GPU memory 105 to the cache memory 107 could also be used. Furthermore, this invention is not limited to the GPU, and could also be used when loading static data into shared memory for which the parallel use by multiple independent processing instances in the RAM 103, for example, is supposed.

As described above, the information processing system of this embodiment can share static data that is loaded into memory in a context in which multiple instances of processing are performed independently. Specifically, the information processing system determines whether static data, for which loading has been requested, is already loaded into shared memory from one of the processes out of the plurality of processes. When the information processing system determines that the static data, for which loading has be requested, is not yet loaded into shared memory, after loading the static data into shared memory, the information processing system notifies the process that made the request for loading with information that identifies the static data that is loaded into shared memory. Furthermore, in the case where the information processing system determines that the static data, for which loading has been requested, is already loaded into shared memory, the information processing system notifies the process that made the request for loading with information that identifies the static data that is already loaded into shared memory.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of U.S. Patent Provisional Application No. 61/556,438, filed Nov. 7, 2011, which is hereby incorporated by reference herein in its entirety.

The invention claimed is:
1. An information processing system that independently performs a plurality of processes that load same static data and use the loaded static data by replication, the static data being fixed data, the information processing system comprising:
- a memory configured to store information that identifies static data elements, the static data elements including rendering objects;
- a graphics processor that performs the plurality of processes to generate game screens for display on a plurality of client devices, the plurality of client devices being connected to the information processing system via a network, the game screens including the static data elements;
- a graphics processor memory into which the static data elements are loaded for generation of the game screens by the plurality of processes, the graphics processor memory being a shared memory for the plurality of processes; and
- a processor or a memory controller configured to perform operations including:
  - loading the static data elements, for which load requests are made by the graphics processor, into the graphics processor memory;
  - receiving a load request, made by the graphics processor from a process out of the plurality of processes, to load a static data element into the graphics processor memory;
  - determining whether the static data element, for which the load request is received, is loaded into the graphics processor memory as one of the static data elements based on the information stored in the memory;
  - in a case where the static data element, for which the load request is received, is not loaded into the graphics processor memory, causing the memory to store information that identifies the static data element which is loaded into the graphics processor memory and, after loading the static data element into the graphics processor memory, notifying the process, that made the load request, with the information stored by the memory that identifies the static data element which is loaded into the graphics processor memory; and
  - in a case where the static data element, for which the load request is received, is already loaded into the graphics processor memory, notifying the process, that made the load request, with the information stored by the memory that identifies the static data element which is already loaded into the graphics processor memory,
- wherein the plurality of processes is performed by the graphics processor to generate one of the game screens for each of the plurality of client devices in parallel.

2. The information processing system according to claim 1, wherein, in the case where the static data element, for which the load request is received, is already loaded into the graphics processor memory, the static data element is not loaded into the graphics processor memory.

3. The information processing system according to claim 1, wherein the information that identifies the static data element which is loaded into the graphics processor memory is a memory handle for the static data element.

4. The information processing system according to claim 1 wherein the processor or the memory controller is configured to manage a memory handle associated with each of the static data elements that is loaded into the graphics processor memory.

5. A control method for controlling an information processing system that independently performs a plurality of processes that load same static data and use the loaded static data by replication, the static data being fixed data, the control method comprising:
- storing, in a memory, information that identifies static data elements, the static data elements including rendering objects;
- performing, by a graphics processor, the plurality of processes to generate game screens for display on a plurality of client devices, the plurality of client devices being connected to the information processing system via a network, the game screens including the static data elements;
- loading, into a graphics processor memory, the static data elements for generation of the game screens by the plurality of processes, the graphics processor memory being a shared memory for the plurality of processes;
- receiving, by a processor or a memory controller, a load request made by the graphics processor from a process out of the plurality of processes to load a static data element into the graphics processor memory;
- determining, by the processor or the memory controller, whether the static data element, for which the load request is received, is loaded into the graphics processor memory as one of the static data elements based on the information stored in the memory;
- in a case where the static data element, for which the load request is received, is not loaded into the graphics processor memory, causing the memory to store information that identifies the static data element which is loaded into the graphics processor memory and, after loading the static data element into the graphics processor memory, notifying the process, that made the load request, with the information stored by the memory that identifies the static data element which is loaded into the graphics processor memory; and
- in a case where the static data element, for which the load request is received, is already loaded into the graphics processor memory, notifying the process, that made the load request, with the information stored by the memory that identifies the static data element that is already loaded into the graphics processor memory,
- wherein the plurality of processes is performed by the graphics processor to generate one of the game screens for each of the plurality of client devices in parallel.

6. The information processing system according to claim 1, further comprising:
- a non-transitory computer-readable recording medium including an executable program that, when executed by the processor or the memory controller, causes the processor or the memory controller to perform the operations.

7. The information processing system according to claim 1, further comprising:
- a game server connected to the plurality of client devices via the network, the game server independently performing game processing, including the plurality of processes, for the plurality of client devices.

8. The information processing system according to claim 7, wherein a same number of game processing instances is performed by the game server as a number of the plurality of client devices connected to the game server via the network.

9. The information processing system according to claim 7, wherein the game processing provides the game screens to the plurality of client devices via the network.

10. The information processing system according to claim 1, wherein the memory includes a management table that stores the information that identifies the static data elements which are loaded into the graphics processor memory.

\* \* \* \* \*